(12) United States Patent
Suzuki et al.

(10) Patent No.: US 9,731,848 B2
(45) Date of Patent: Aug. 15, 2017

(54) BREAD CONVEYING APPARATUS

(71) Applicant: Oshikiri Machinery Ltd., Fujisawa-shi (JP)

(72) Inventors: Minoru Suzuki, Fujisawa (JP); Masami Umetsu, Fujisawa (JP); Takahiro Hasegawa, Fujisawa (JP); Shigehisa Sakamoto, Fujisawa (JP); Tamotsu Abe, Fujisawa (JP); Takeshi Nakamura, Fujisawa (JP); Tasuku Fujita, Fujisawa (JP)

(73) Assignee: OSHIKIRI MACHINERY LTD., Fujisawa-Shi, Kanagawa-Ken (JP)

( * ) Notice: Subject to any disclaimer, the term of this patent is extended or adjusted under 35 U.S.C. 154(b) by 431 days.

(21) Appl. No.: 14/194,172

(22) Filed: Feb. 28, 2014

(65) Prior Publication Data

US 2014/0245703 A1 Sep. 4, 2014

(30) Foreign Application Priority Data

Mar. 1, 2013 (JP) ................................. 2013-040610

(51) Int. Cl.
*B65B 25/16* (2006.01)
*B65G 37/00* (2006.01)
(Continued)

(52) U.S. Cl.
CPC .............. *B65B 25/16* (2013.01); *B65B 5/045* (2013.01); *B65B 35/205* (2013.01); *B65G 37/00* (2013.01);
(Continued)

(58) Field of Classification Search
CPC ......... B65B 25/16; B65B 5/08; B65B 35/243; B65B 35/205
(Continued)

(56) References Cited

U.S. PATENT DOCUMENTS 1,851,295 A * 3/1932 Schmitt .................. B65B 11/22
53/201
3,064,403 A * 11/1962 Tokos ..................... B65B 51/18
53/371.4
(Continued)

FOREIGN PATENT DOCUMENTS

JP 47-12478 A 6/1972
JP 48-39275 A 11/1973
(Continued)

OTHER PUBLICATIONS

Movie showing machine of Georg Hartmann Maschinenbau GmbH http://www.youtube.com/watch?v=2YP2H9MnDNo.
(Continued)

*Primary Examiner* — Thanh Truong
*Assistant Examiner* — Dariush Seif
(74) *Attorney, Agent, or Firm* — McGinn IP Law Group, PLLC

(57) ABSTRACT

A bread packaging apparatus for packaging bread in a bag, includes a first urging unit that comes into contact with a loaf of bread and conveys the loaf of bread along a conveying path; and a control unit for controlling a speed of the first urging unit. The control unit controls the speed of the first urging unit such that the speed when the first urging unit comes into contact with the loaf of bread is different from the speed when the first urging unit conveys the loaf of bread.

24 Claims, 6 Drawing Sheets

(51) Int. Cl.
*B65B 35/20* (2006.01)
*B65B 5/04* (2006.01)
*B65B 35/24* (2006.01)
*B65B 43/34* (2006.01)
*B65B 43/36* (2006.01)

(52) U.S. Cl.
CPC .............. *B65B 35/24* (2013.01); *B65B 43/34* (2013.01); *B65B 43/36* (2013.01)

(58) Field of Classification Search
USPC ....... 53/258; 198/817, 419.2, 728, 732, 729, 198/730, 731, 733
See application file for complete search history.

(56) References Cited

U.S. PATENT DOCUMENTS

| | | | |
|---|---|---|---|
| 3,217,464 A | 11/1965 | Feingold | |
| 3,228,171 A | 1/1966 | Cory | |
| 3,504,784 A * | 4/1970 | Noyes | B65B 5/045 198/732 |
| 3,527,337 A * | 9/1970 | Formo | B65B 35/205 198/732 |
| 3,590,553 A | 7/1971 | Formo | |
| 3,603,059 A | 9/1971 | Carnes et al. | |
| 3,687,447 A * | 8/1972 | Mundus | B31B 19/00 198/803.9 |
| 3,732,969 A | 5/1973 | Formo | |
| 3,930,352 A | 1/1976 | Carnes | |
| 4,457,124 A * | 7/1984 | Hartmann | B65B 5/045 53/284.7 |
| 4,548,315 A * | 10/1985 | Briggs | B62D 55/06 198/304 |
| 4,613,034 A * | 9/1986 | Hibi | B65G 19/02 198/465.1 |
| 4,704,841 A * | 11/1987 | Langenbeck | B65B 5/101 53/251 |
| 5,141,219 A * | 8/1992 | Watts | B65H 29/16 198/419.3 |
| 5,228,275 A | 7/1993 | Formo | |
| 5,369,833 A * | 12/1994 | Uttke | E01H 1/042 15/84 |
| 5,501,318 A * | 3/1996 | Disrud | B65G 47/841 198/728 |
| 5,511,364 A * | 4/1996 | Levi | B65B 43/34 53/258 |
| 5,884,749 A * | 3/1999 | Goodman | B65G 47/082 198/418 |
| 6,019,213 A * | 2/2000 | Schubert | B65G 17/26 198/419.3 |
| 6,499,731 B2 * | 12/2002 | Werner | B65G 17/18 198/728 |
| 6,691,856 B1 * | 2/2004 | Prakken | B65G 17/26 198/419.3 |
| 6,698,576 B2 * | 3/2004 | Hahnel | B65G 17/26 198/469.1 |
| 7,537,105 B2 * | 5/2009 | Fourney | B65G 17/24 198/728 |
| 7,588,239 B2 * | 9/2009 | Marcinik | B65H 31/40 198/412 |
| 8,336,700 B2 * | 12/2012 | Warecki | B65B 5/103 198/339.1 |
| 8,448,776 B2 * | 5/2013 | Papsdorf | B65B 5/106 198/370.08 |
| 9,096,377 B2 * | 8/2015 | Bergler | B65G 47/28 |
| 2003/0079962 A1 * | 5/2003 | Cerutti | B65G 47/31 198/459.1 |
| 2009/0313955 A1 * | 12/2009 | Gudim | B65B 5/068 53/534 |
| 2010/0200371 A1 * | 8/2010 | Reuteler | B31B 1/78 198/730 |
| 2011/0139582 A1 * | 6/2011 | Herrmann | B65G 15/44 198/572 |
| 2011/0296966 A1 * | 12/2011 | Oki | B26D 1/46 83/421 |
| 2012/0067693 A1 * | 3/2012 | Suzuki | B65B 5/045 198/339.1 |

FOREIGN PATENT DOCUMENTS

JP 2004-284603 A 10/2004
JP 2012-066891 A 4/2012

OTHER PUBLICATIONS

Movie showing machine of Georg Hartmann Maschinenbau GmbH http://www.youtube.com/watch?v=mT3NvdJWjLo.
A publication of amendment for Japanese Patent Application Laid-Open No. 2004-284603, English excerpt translation of a Notice of Rejected Reasons, dispatched on Nov. 15, 2016 and issued in the corresponding Japanese Patent Application No. 2013-040610.

* cited by examiner

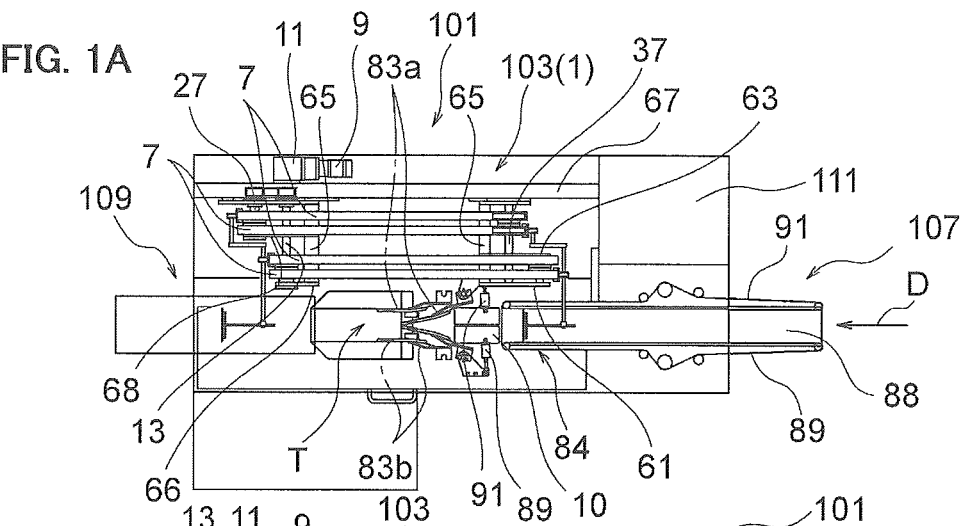
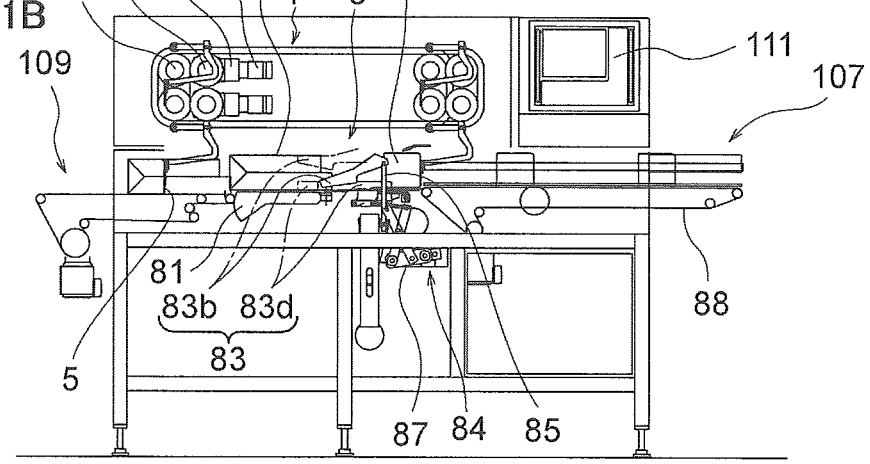
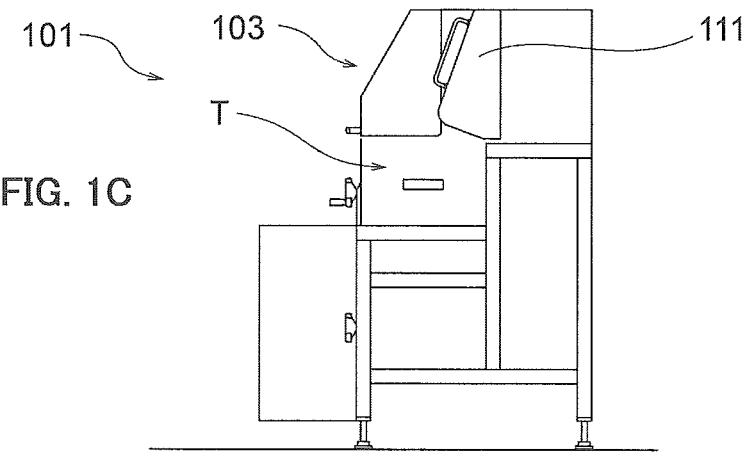

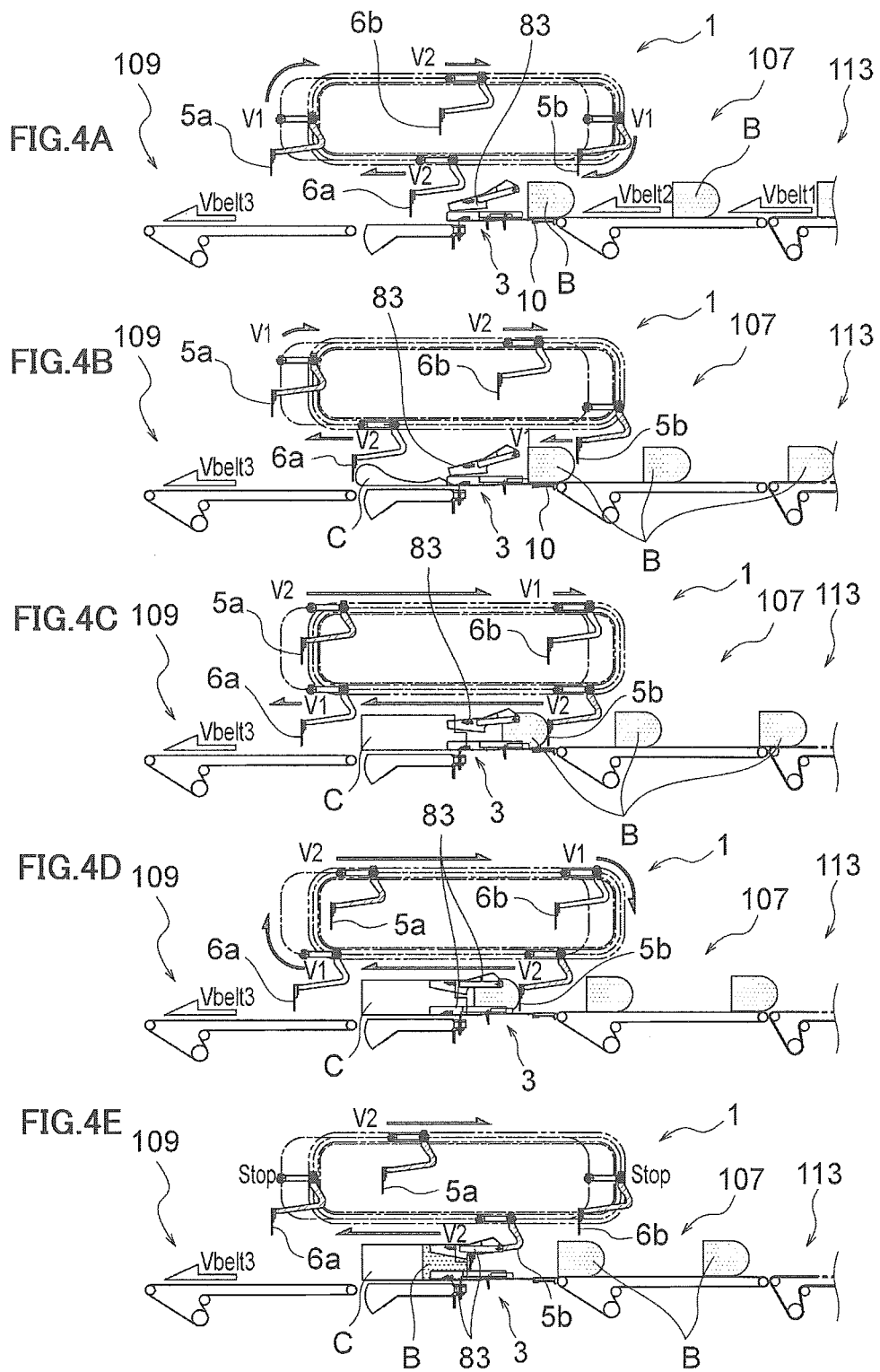

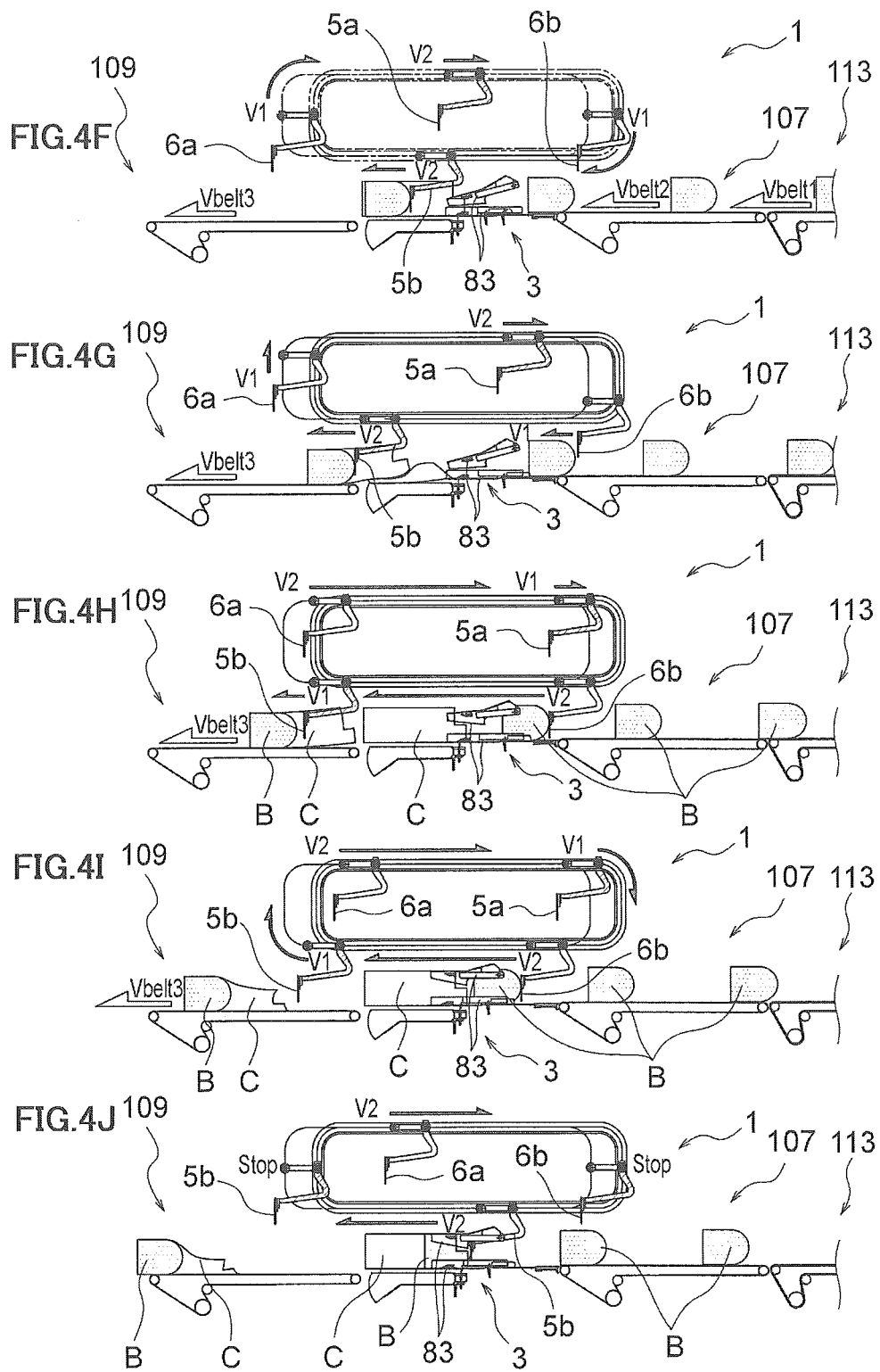

BREAD CONVEYING APPARATUS

BACKGROUND OF THE INVENTION

Field of the Invention

The present invention relates to a bread packaging apparatus for packaging bread in a bag and to a bread conveying system for conveying bread along a conveying path. In particular, the present invention relates to a bread packaging apparatus and a bread conveying system that can convey bread in a reliable manner without damage to the bread and crushing of the bread during conveyance of the bread.

Description of the Related Art

Various apparatuses have been conventionally used as means for conveying articles such as bread to be packaged in bags.

For example, an article packaging apparatus disclosed in U.S. Pat. No. 3,603,059 includes: a flighted in-feed conveyor for conveying articles to a standby position; means for supplying an inflated bag to a packaging position spaced apart from the standby position; and a pusher bar assembly which is means that engages an article at the standby position to package the article in the inflated bag.

The pusher bar assembly includes a plurality of pusher bars, and each of the plurality of pusher bars engages an article at the standby position, advances the article through a scoop assembly that holds an inflated bag, and pushes the article into the bag. The pusher bar pushes the article introduced into the bag such that the article abuts against the inner bottom of the bag. When the article is further pushed, the packaged article is removed from the means for supplying the bag and is transferred to an out-feed conveyor. Then the out-feed conveyor conveys the bagged article to a downstream step.

The pusher bar assembly for packaging articles in bags includes shafts moved rotationally by endless chains, and struts to which the pusher bars to be in contact with the articles are secured are attached to the shafts. Therefore, when the endless chains are moved rotationally, the pusher bars are moved rotationally and reciprocatingly between the standby position at which the pusher bars come into contact with articles and the packaging position at which a bag is disposed.

As described above, the article packaging apparatus continuously performs a process including: packaging articles supplied continuously by the in-feed conveyer in bags by moving the pusher bars reciprocatingly toward the articles; and transferring the bagged articles to the out-feed conveyer.

In the article packaging apparatus in U.S. Pat. No. 3,603,059, the pusher bars are moved rotationally to convey articles. With this apparatus, when relatively soft articles such as bread are conveyed, the pusher bars may cause damage to the articles such as bread when the pusher bars come into contact with the articles, and the articles may be sent flying by an impact received from the pusher bars. To prevent the articles from being damaged and sent flying, the pusher bars may be driven at low speed. However, in this case, it may be difficult to increase the processing speed of the article packaging apparatus.

SUMMARY OF THE INVENTION

The present invention has been made in view of the foregoing circumstances. Accordingly, it is an object to provide a bread packaging apparatus and a bread conveying system that can perform a bread packaging process or a bread conveying process at a high speed while articles such as bread are prevented from being damaged during conveyance of the articles and from being sent flying when the articles receive an impact during conveyance.

To solve the above problem and attain the object of the invention, a first aspect of the invention is a bread packaging apparatus for packaging bread in a bag, the apparatus comprising: a first urging unit that comes into contact with a loaf of bread and conveys the loaf of bread along a conveying path; and a control unit for controlling a speed of the first urging unit; wherein the control unit controls the speed of the first urging unit such that the speed when the first urging unit comes into contact with the loaf of bread is different from the speed when the first urging unit conveys the loaf of bread.

Further, to solve the above problem and attain the object of the invention, a sixth aspect of the invention is a bread conveying system for conveying a plurality of loaves of bread along a conveying path, the system comprising: a first urging unit that comes into contact with a loaf of bread and conveys the loaf of bread along the conveying path; a second urging unit that comes into contact with another loaf of bread and conveys the another loaf of bread along the conveying path; and a control unit for controlling a speed of the first urging unit and speed of the second urging unit; wherein the control unit controls the first urging unit and the second urging unit such that the speed of the first urging unit is different from the speed of the second urging unit.

In the present description, a downstream side means a downstream side in the direction of conveyance of bread along a conveying path, and an upstream side means an upstream side in the direction of conveyance of bread along the conveying path.

In the bread packaging apparatus and bread conveying system according to the present invention, the speed of first urging unit when an article such as bread is conveyed can be set to be different from the speed of the first urging unit when it comes into contact with the bread. Therefore, in the bread packaging apparatus and bread conveying system of the present invention, the speed of the first urging unit when it comes into contact with the bread can be set such that the impact on the bread is suppressed. In addition, the speed of the first urging unit when it conveys the bread can be set to a desired speed. Therefore, the first urging unit for conveying bread can be driven at the desired speed while the impact of the first urging unit on the bread is suppressed, so that the bread can be conveyed or packaged efficiently in a reliable manner.

BRIEF DESCRIPTION OF THE DRAWINGS

FIG. 1A is a plan view schematically illustrating a bread conveying system according to an embodiment, FIG. 1B is a front view schematically illustrating the bread conveying system according to the embodiment, and FIG. 1C is a side view schematically illustrating the bread conveying system according to the embodiment;

FIGS. 4A to 4J are front views of the packaging apparatus, the in-feed conveyer, and the out-feed conveyer in the step of packaging bread in a bag.

DESCRIPTION OF THE EMBODIMENTS

Figure 2:
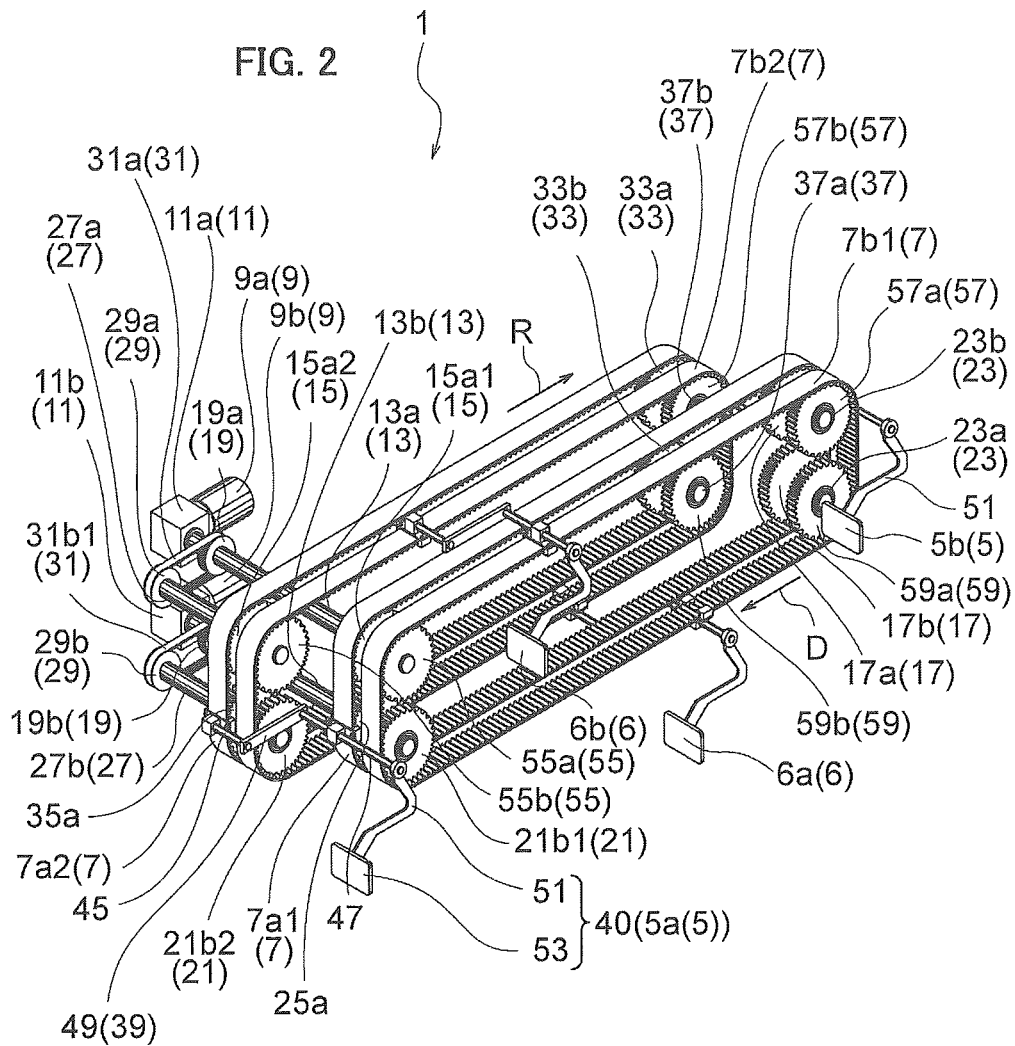
FIG. 2 is a partial perspective view illustrating part of a pusher assembly shown in FIGS. 1A to 10.

A bread packaging apparatus according to the present invention and a bread conveying system according to an embodiment to which the bread packaging apparatus is applied will next be described with reference to the drawings. However, the present invention is not limited to this embodiment.

[Bread Conveying System]

FIG. 1A is a plan view schematically illustrating a bread conveying system according to an embodiment, FIG. 1B is a front view schematically illustrating the bread conveying system according to the embodiment, and FIG. 10 is a side view schematically illustrating the bread conveying system according to the embodiment.

The bread conveying system 101 mainly includes: a bread packaging apparatus 103 for packaging a substantially cubic loaf of bread in a bag; an in-feed conveyer 107 for conveying the loaf of bread from an out-feed conveyer 113 (see FIGS. 3A and 3B) used in an upstream step to the bread packaging apparatus 103; an out-feed conveyer 109 for conveying the loaf of bread bagged by the bread packaging apparatus 103 to a downstream step; and a controller 111 for controlling the operation of the bread conveying system 101. Each of the components will next be described.

[Bread Packaging Apparatus]

Figure 3A:
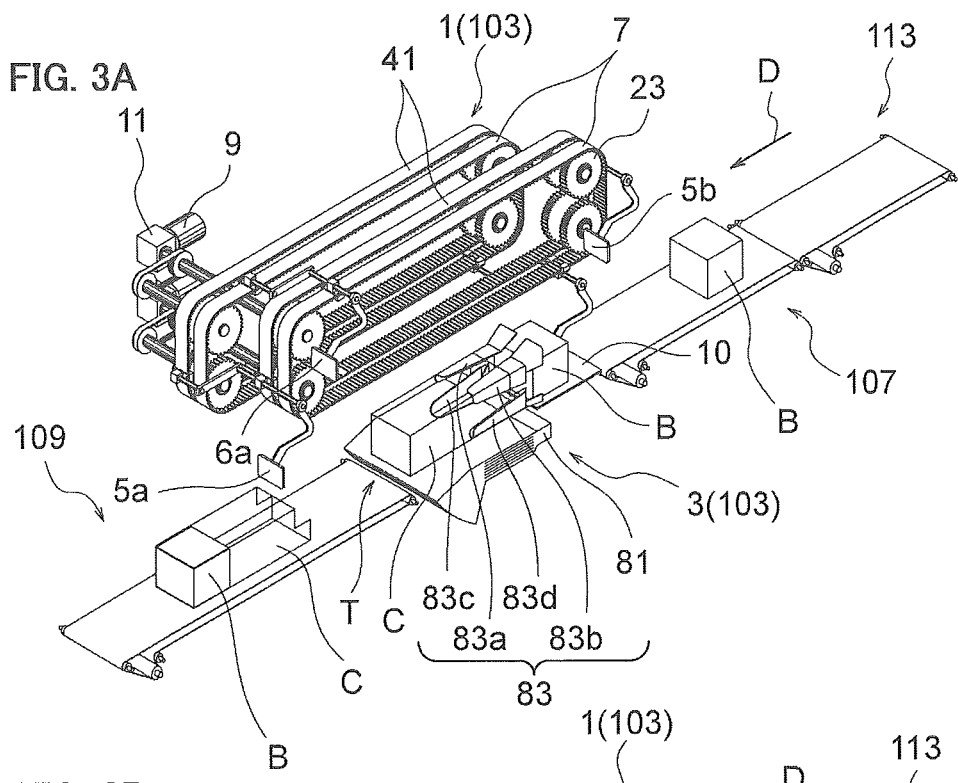
FIGS. 3A and 3B are perspective views illustrating a packaging apparatus, an in-feed conveyer, and an out-feed conveyer shown in FIGS. 1A to 1C and showing the step of packaging bread in a bag.
Figure 3B:
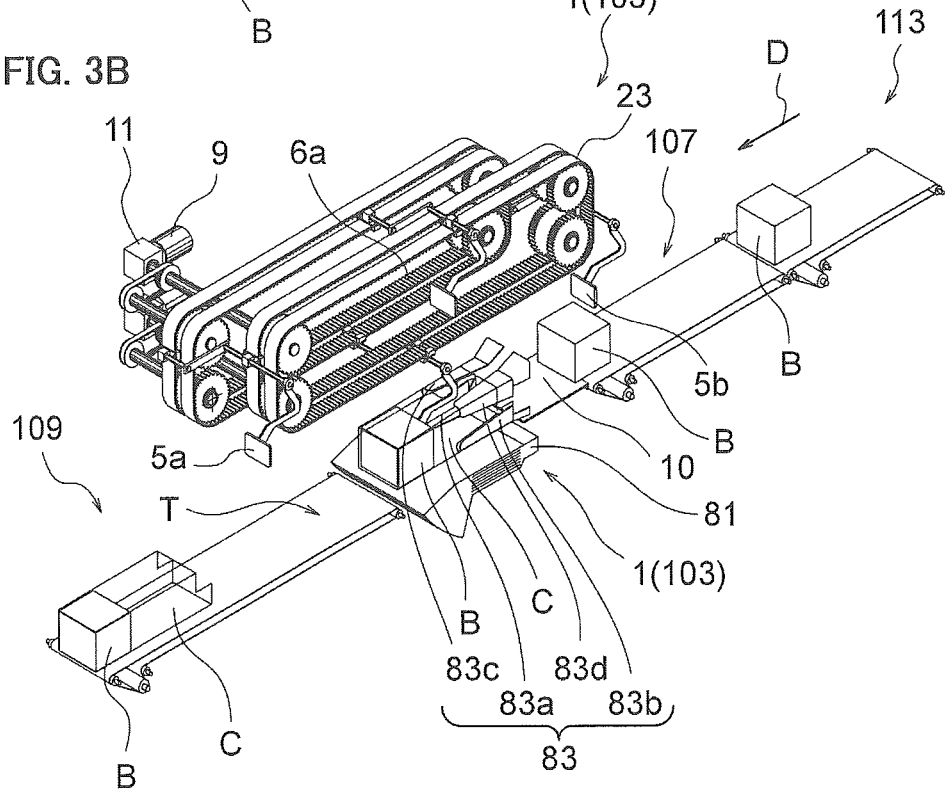

The bread packaging apparatus 103 will next be described with reference to FIGS. 1A to 3B. FIG. 2 is a partial perspective view illustrating part of a pusher assembly shown in FIGS. 1A to 1C; FIGS. 3A and 3B are perspective views illustrating a packaging apparatus, an in-feed conveyer, and an out-feed conveyer shown in FIGS. 1A to 1C and showing the step of packaging bread in a bag.

As shown in FIGS. 1A, 1B, 2, 3A to 3B, the bread packaging apparatus 103 includes a pusher assembly 1 and a bag supplying unit 3. The pusher assembly 1 includes: paddles 5 and 6 serving as a first urging unit that comes into contact with a loaf of bread B to convey the loaf of bread B along a conveying path T; and the controller 111 serving as a control unit for controlling the speed of the paddles 5 and 6. The speed of the paddles 5 and 6 when one of the paddles 5 and 6 comes into contact with a loaf of bread B can be controlled by the controller 111 so as to be different from the speed of the paddles 5 and 6 when the loaf of bread B is conveyed. In this embodiment, the conveying path T is constituted by the upper surface of an endless belt of the in-feed conveyer 107 in the plan view, the upper surface of a conveying table 10 in the bag supplying unit 3 in the plan view, the upper surface of a bag holding portion 81 in the plan view, and the upper surface of an endless belt of the out-field conveyer 109 in the plan view.

As shown in FIG. 2, the pusher assembly 1 in this embodiment includes first and second driving systems, and these driving systems can be controlled independently by the controller 111. Each driving system includes a drive motor 9, a worm gear in a worm box 11, a driving shaft 13, driving pulleys 15, 21, and driven pulleys 17, 25a, 33, 35a, 55, 57, 59. Since these driving systems have substantially the same configuration, a description will be given of the first driving system. For the second driving system, components different from those in the first driving system will be described.

The first driving system includes a first drive motor 9a that can supply a rotational force in response to a command signal from the controller 111. The driving shaft (not shown) of the first drive motor 9a is connected to a first main driving shaft 13a through a worm gear (not shown) disposed in a first worm box 11. The above worm gear has a conventionally known configuration and includes a worm and a worm wheel having a rotation axis extending in a direction orthogonal to the rotation axis of the worm. The worm wheel changes the direction of rotation.

A first driving force transmission pulley 19a, a first driving pulley 15a1, and a first driven pulley 55a, which is a component of the second driving system, are attached to the first main driving shaft 13a so as to be spaced apart from each other in the direction of the axis of the first main driving shaft 13a. Since the first driving force transmission pulley 19a and the first driving pulley 15a1 serving as a first driving rotation body are fitted to the first main driving shaft 13a, the rotational force of the first main driving shaft 13a is transmitted to the first driving force transmission pulley 19a and the first driving pulley 15a1.

First shafts 23 each having an axis parallel to the rotation axis of the first main driving shaft 13a are fixedly disposed. The first shafts 23 include a first forward shaft 23a and a first return shaft 23b spaced apart from each other and are disposed on the upstream side of the first main driving shaft 13a in a conveying direction D.

The rotation axis of the first forward shaft 23a and the rotation axis of the first return shaft 23b are spaced apart from each other in a direction orthogonal to the conveying direction D. A driven pulley 17a serving as a second driven rotation body opposed to the first driving pulley 15a1 in a return direction R (a direction opposite to the conveying direction D) is rotatably attached to the first return shaft 23b, and a driven pulley 17b serving as a third driven rotation body is rotatably attached to the first forward shaft 23a. A driven pulley 25a serving as a first driven rotation body is rotatably attached to a second main driving shaft 13b, which is a component of the second driving system described later, so as to be spaced apart from the first driving pulley 15a1 in a direction orthogonal to the conveying direction D.

An endless belt 7a1 serving as a first endless belt-shaped body is wound over the first driving pulley 15a1, the first driven pulley 25a, the second driven pulley 17a, and the third driven pulley 17b. When the first driving pulley 15a1 rotates, convex portions engraved on the outer circumferential surface of the first driving pulley 15a1 mesh with concave portions formed on the inner circumferential surface of the first endless belt 7a1. The first endless belt 7a1 is thereby moved rotationally, and the second driven pulley 17a, the third driven pulley 17b, and the first driven pulley 25a are rotated. As described above, the first to third driven pulleys 25a, 17a, and 17b are rotatably supported by the first shafts 23 and the second main driving shaft 13b. The first endless belt 7a1 moves rotationally along a rounded rectangular trajectory, as viewed from the front in FIGS. 1B, 3A, 3B, etc.

A first driving force receiving pulley 29a(29) is fitted to a first sub-driving shaft 27a that is rotatably supported on the downstream side of the first main driving shaft 13a in the conveying direction D so as to be spaced apart from the first main driving shaft 13a. A first driving force transmission belt 31a(31) serving as an endless belt-shaped body is wound over the first driving force transmission pulley 19a and the first driving force receiving pulley 29a, and the rotational force of the first main driving shaft 13a is transmitted to the first sub-driving shaft 27a through the first driving force transmission belt 31a.

A first sub-driving pulley 15a2 is fitted to the first sub-driving shaft 27a at a position spaced apart from the first driving force receiving pulley 29a in the direction of the rotation axis of the first sub-driving shaft 27a. Therefore, the rotational force transmitted to the first driving force receiving pulley 29a is transmitted to the first sub-driving pulley 15a2. As described above, the first driving pulley 15a1 and the first sub-driving pulley 15a2 are driven synchronously by the rotational force of the first drive motor 9a.

A third endless belt 7a2 is wound over the first sub-driving pulley 15a2, a first driven pulley 35a, a second driven pulley 33a, and a third driven pulley 33b such that these pulleys cooperate with each other in the same manner that the first driving pulley 15a1 cooperates with the first driven pulley 25a, the second driven pulley 17a, and the third driven pulley 17b. The first driven pulley 35a is rotatably supported by a second sub-driving shaft 27b described later. The second sub-driving shaft 27b has an axis parallel to the rotation axis of the first sub-driving shaft 27a and extending in a direction orthogonal to the conveying direction D. Of course, convex portions that mesh with concave portions formed on the inner circumferential surfaces of the first endless belt 7a1 and the third endless belt 7a2 are provided on the outer circumferential surfaces of the second driven pulleys 17a and 33a and the third driven pulleys 17b and 33b.

A second return shaft 37b is disposed such that its axis is parallel to the rotation axis of the first sub-driving shaft 27a and located on the upstream side of the first sub-driving shaft 27a in the conveying direction D. The second driven pulley 33a is fitted to the second return shaft 37b so as to be rotatable with respect to the second return shaft 37b. The third driven pulley 33b is rotatably supported by a second forward shaft 37a that is parallel to the second sub-driving shaft 27b and located on its upstream side in the conveying direction D.

The first driven pulley 25a, the second driven pulley 17a, the third driven pulley 17b, and the first endless belt 7a1 that cooperate with the first driving pulley 15a1 have the same dimensions and shapes as those of the first driven pulley 35a, the second driven pulley 33a, the third driven pulley 33b, and the third endless belt 7a2 that cooperate with the first sub-driving pulley 15a2.

Paddles 5 for pressing and conveying loaves of bread are attached to the first and third endless belts 7a1 and 7a2. In this embodiment, two paddles 5a and 5b are disposed so as to be spaced apart at regular intervals in the circumferential direction of the endless belts 7. Each paddle 5 includes a paddle securing portion 39 secured to the first and third endless belts 7a1 and 7a2 and a pad portion 40 that is supported by the paddle securing portion 39 and comes into contact with a loaf of bread B.

The paddle securing portion 39 includes: a bridging rod portion 45 parallel to the first sub-driving shaft 27a and extending on the outer circumferential side of the third endless belt 7a2 and a forth endless belt 7b2 described later; a bridging rod portion 47 extending on the outer circumferential side of the first endless belt 7a1 and a second endless belt 7b1 described later; and a link rod 49 that links these rod portions 45 and 47 and extends in the conveying direction D. The bridging rod portions 45 and 47 are secured to the third and first endless belts 7a2 and 7a1, respectively, using a known securing device such as a screw and a nut.

The pad portion 40 includes: a contact portion 53 having a flat contact surface extending in a vertical direction and to be in contact with a convex surface; and a paddle supporting portion 51 that is connected to the bridging rod portion 47 and bent such that the contact portion 53 can come into contact with a loaf of bread B located in the conveying path T. The shape of the contact surface of the contact portion 53 in this embodiment can be appropriately changed to a curved shape, a bent shape, etc. according to the shape of an object to be in contact with the contact surface. The first driving system having the configuration described above causes the first pads 5 to move along a substantially rounded rectangular trajectory as viewed from the front.

As shown in FIG. 1A, the bread packaging apparatus 103 further includes: a support beam 67 extending in the conveying direction D and secured to a wall member included in the casing of the bread packaging apparatus 103; a pair of stays 65 each secured to the support beam 67 at one end portion; and shaft support members 61, 63, and 66 each connected to one of the pair of stays 65, although these are omitted in FIGS. 2, 3A, and 3B for the purpose of simplifying the figures. The shaft support members 61 and 63 which are paired and to which the longitudinal opposite ends of the shafts 23 are connected are connected to the stay 65 disposed on the upstream side in the conveying direction D. One longitudinal end portion of each shaft 37 is connected to the support beam 67, and the other end portion is secured to the shaft support member 61. As described above, each of the shafts 23 and 37 is supported like a cantilever by the support beam 67 at one end.

One end portion of each driving shaft 13 is rotatably attached to the shaft support member 66 secured to the stay 65 disposed on the downstream side, and the other end portion of each driving shaft 13 in the vicinity of the worm box 11 is rotatably supported by the support beam 67. One end portion of each sub-driving shaft 27 is rotatably attached to a shaft support member 68 secured to the stay 65 disposed on the downstream side, and the other end portion of each sub-driving shaft 27 in the vicinity of the worm box 11 is rotatably supported by the stay 65. Each of the shaft support members 66 and 68 is supported like a cantilever by the support beam 67 at one end. In this embodiment, each of the driving shafts 13, sub-driving shafts 27, and shafts 23 and 37 is supported like a cantilever at one end in order to avoid interference with a loaf of bread B traveling along the conveying path T and to perform maintenance with ease. However, of course, each of these shafts may be supported like a double-supported beam at opposite ends so as not to interfere with a conveying object such as a loaf of bread.

As shown in FIGS. 1A to 1C and 2, the second driving system for driving the second paddles 6 is configured similarly to the first driving system for driving the first paddles 5. Therefore, the configuration of the second driving system is the same as that of the first driving system, unless otherwise specifically mentioned. The second driving system includes a second drive motor 9b that supplies a rotational force in response to a command signal from the controller 111. The driving shaft (not shown) of the second drive motor 9b meshes with a warm shaft (not shown) disposed in a second worm box 11b. A worm gear is connected to the second main driving shaft 13b. The configuration of the worm gear is the same as the configuration described for the first driving system.

A main driving pulley 21b1 serving as a second driving rotation body is fitted to the second main driving shaft 13b. A driven pulley 57a serving as a second driven rotation body is rotatably attached to the first return shaft 23b parallel to the rotation axis of the first main driving shaft 13a, and a driven pulley 59a serving as a third driven rotation body is rotatably attached to the first forward shaft 23a. A driven pulley 55a serving as a first driven rotation body is rotatably attached to the first main driving shaft 13a.

An endless belt 7b1 serving as a second endless belt-shaped body is wound over the second driving pulley 21b1, the first driven pulley 55a, the second driven pulley 57a, and the third driven pulley 59a. When the second driving pulley 21b1 rotates, convex portions engraved on the outer circumferential surface of the second driving pulley 21b1 mesh with concave portions formed on the inner circumferential surface of the second endless belt 7b1. The second endless belt 7b1 is thereby moved rotationally, and the first driven pulley 55a, the second driven pulley 57a, and the third driven pulley 59a are rotated.

A second driving force receiving pulley 29b(29) is fitted to the second sub-driving shaft 27b that is disposed on the downstream side of the second main driving shaft 13b in the conveying direction D so as to be spaced apart from the second main driving shaft 13b. A second driving force transmission belt 31b(31) serving as an endless belt-shaped body is wound over a second driving force transmission pulley 19b and the second driving force receiving pulley 29b, and the rotational force of the second main driving shaft 13b is transmitted to the second sub-driving shaft 27b through the second driving force transmission belt 31b.

A second sub-driving pulley 21b2 is fitted to the second sub-driving shaft 27b at a position spaced apart from the second driving force receiving pulley 29b in the direction of the rotation axis of the second sub-driving shaft 27b. Therefore, the rotational force transmitted to the second driving force receiving pulley 29b is transmitted to the second sub-driving pulley 21b2. As described above, the second driving pulley 21b1 and the second sub-driving pulley 21b2 are driven synchronously by the rotational force of the second drive motor 9b.

The forth endless belt 7b2 is wound over the second sub-driving pulley 21b2, a first driven pulley 55b, a second driven pulley 57b, and a third driven pulley 59b such that these pulleys cooperate with each other. The first driven pulley 55b is rotatably supported by the first sub-driving shaft 27a. The second driven pulley 57b is rotatably attached to the return shaft 37b. The third driven pulley 59b is rotatably attached to the forward shaft 37a.

In this embodiment, the first driven pulley 55a, the second driven pulley 57a, the third driven pulley 59a, and the second endless belt 7b1 that cooperate with the second driving pulley 21b1 have the same dimensions and shapes as those of the first driven pulley 55b, the second driven pulley 57b, the third driven pulley 59b, and the forth endless belt 7b2 that cooperate with the second driving pulley 21b2.

Paddles 6 for pressing and conveying loaves of bread are attached to the second and fourth endless belts 7b1 and 7b2. In this embodiment, two paddles 6 are disposed so as to be spaced apart at regular intervals in the circumferential direction of the second and fourth endless belts 7. The above-described paddles 5 and paddles 6 are arranged alternately as viewed from the front. The configuration of the paddles 6 is the same as the configuration of the paddles 5 driven by the first driving system except for their secured portions, and their detailed description will be omitted.

The paddles 5 driven by the above-configured first driving system and the paddles 6 driven by the second driving system are configured such that the contact portions 53 of the paddles 5 and 6 pass alternately through an arbitrary position in the conveying path T. In this embodiment, two paddles 5 are attached to one endless belt 7. However, of course, only a single paddle may be attached to one endless belt, or the number of paddles may be different for each driving system. In this embodiment, in order to ensure the supporting stiffness of the paddles 5(6), the paddles 5(6) are supported by two endless belts 7. However, the paddles 5(6) may be supported by one endless belt. More specifically, in such a configuration, the first and second sub-driving shafts 27 and the pulleys associated therewith are not provided.

[Bag Supplying Unit]

The bag supplying unit 3 included in the bread packaging apparatus 103 is disposed below the pusher assembly 1 in FIGS. 1A to 1C, 3A, and 3B. The bag supplying unit 3 has a conventionally known configuration, and this configuration will be described in brief. The bag supplying unit 3 includes: jaws 83 for opening the mouth of a folded bag C and holding the opened bag C; a jaw opening-closing mechanism 84 for opening and closing the jaws 83; a bag holding portion 81 for holding a plurality of folded bags C; and a mounting table 10 on which a loaf of bread B is mounted on the upstream side of the bag holding portion 81.

The bag holding portion 81 is disposed in the conveying path T through which loaves of bread B pass and holds the stacked bags C such that the topmost exposed bag C is substantially flush with the upper surface of the mounting table 10. The jaws 83 include an upper right jaw 83a, a lower right jaw 83c, an upper left jaw 83b, and a lower right jaw 83d that are arranged left-right symmetrically as viewed in the conveying direction D. An actuator (not shown) such as an air cylinder is connected to these four jaws 83a to 83d through links 85 and 87.

When the actuator is actuated, the four jaws 83a to 83d are opened (as shown by alternate long and short dashed lines in FIG. 1B). In this case, the jaws 83a to 83d are opened to the maximum extent such that the shape of the mouth of a bag C opened by the jaws 83a to 83d is complementary to the shape of a loaf of bread B. The end portions of the jaws 83a to 83d on the downstream side in the conveying direction D are spaced apart from each other.

When the actuator is actuated and the four jaws 83a to 83d are closed (as shown by solid lines in FIG. 1B), the end portions of the four jaws 83a to 83d on the downstream side in the conveying direction D come close to each other. When the closed state of the jaws 83 is changed to the opened state, the upper right jaw 83a and the upper left jaw 83b advance, and the end portions (the portions on the downstream side in the conveying direction D) of the jaws 83a and 83b enter a bag C while moving upward and hold the mouth of the bag C.

The lower right jaw 83c and the lower left jaw 83d enter the bag C through its mouth and hold the mouth of the bag C. Of course, an air blowing apparatus (not shown) is disposed in the vicinity of the bag holding portion 81, in order to open the mouth of the bag C held in the bag holding portion 81 so that the end portions of the jaws 83 can enter the bag C. The jaws 83 are operated in response to an operation signal from the controller 111.

[Operation of Bread Conveying System]

The operation of the bread conveying system will be described with reference to FIGS. 4A to 4J and 5. FIGS. 4A to 4J are front views of the packaging apparatus, the in-feed conveyer, and the out-feed conveyer in the step of packaging bread in a bag and FIG. 5 is a graph showing the relation between the moving distance (L) of a paddle in the pusher assembly and an elapsed time (t).

Figure 5:
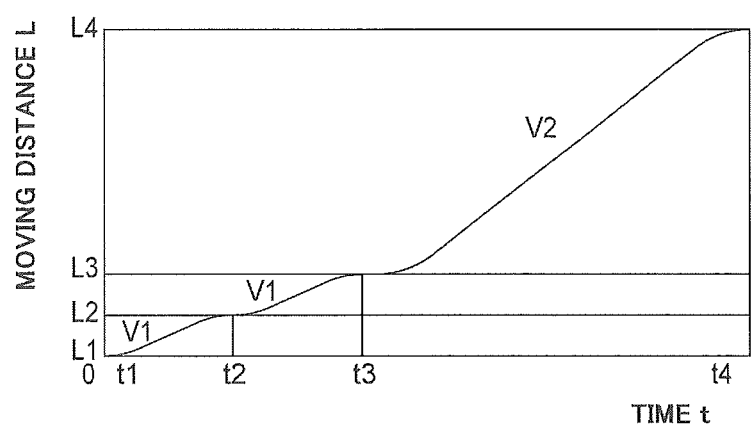
FIG. 5 is a graph showing the relation between the moving distance (L) of a paddle in the pusher assembly and elapsed time (t).

FIG. 4A illustrates a state in which the paddle 5b (and the paddle 5a) moved rotationally by the first driving system is stopped, and this state corresponds to time t2 in a graph in FIG. 5. At this point, a first loaf of bread B is transferred to the table 10 of the bread packaging apparatus 103 by the in-feed conveyer 107. The paddle 5*b* in the state shown in FIG. 4A is moved to a position shown in FIG. 4B at speed V1 shown in FIG. 5 and is then stopped (this state corresponds to time t3 in FIG. 5).

A state illustrated in FIG. 4C shows that the stopped paddle 5*b* is moved at speed V2 (this state corresponds to time t3 in FIG. 5). The positional relation in which the contact portion (see reference numeral 53 in FIGS. 3A and 3B) of the paddle 5*b* is in contact with the loaf of bread B is achieved with the paddle 5*b* being in the above stopped state (speed: 0) or moving at a relatively low speed. Since the paddle 5*b* comes into contact with the loaf of bread B at a relatively low speed as described above, the loaf of bread B can be prevented from being damaged and from being sent flying from the conveying path T by an impact applied to the loaf of bread B from the paddle 5*b*. At this point, the mouth of the bag C is opened by the jaws 83 (see FIGS. 3A and 3B), so that the loaf of bread B can pass through the space formed by the jaws 83.

In FIG. 5, the speed V1 of the paddle 5*b* until it comes into contact with the loaf of bread B is lower than the speed V2 when the paddle 5*b* conveys the loaf of bread B. However, of course, the speed V1 is not necessarily always lower than the speed V2. The speed of the paddle 5 when it comes into contact with the loaf of bread B is not necessarily 0 and may be set such that the loaf of bread B is not damaged and not sent flying from the conveying path T.

As shown in FIG. 4D, the puddle paddle 5*b* pushes the loaf of bread B at V2, so that the loaf of bread B enters the space formed by the jaws 83 and passes through the mouth of the bag C (FIGS. 4E and 4F). The speed of the paddle 5*b* is not necessarily increased from 0 to V2. When V2 is a speed suitable for conveyance, the speed may be increased from V1 to V2.

FIG. 4G illustrates a state in which the flat bottom surface of the loaf of bread B reaches the inner bottom surface of the bag C that is opposed to its mouth and then the loaf of bread B is transferred to the out-feed conveyer 109. This point corresponds to t4 in FIG. 5. More specifically, at the point in time shown in FIG. 4G, the speed V2 of the paddle 5*b* is set to be lower than the speed Vbelt3 of the out-feed conveyer 109. In this embodiment, the speed V2 of the paddle 5*b* is set to be 0 or a value close to 0. Therefore, as shown in FIG. 4H, the bagged loaf of bread B transferred to the out-feed conveyer 109 is released from contact with the paddle 5*b* and conveyed to a downstream step. Then the paddle 5*b* is moved at speed V1 and spaced apart from the conveying path T (time t1 in FIG. 5). The speed of the paddle 5*b* when it is released from contact is not necessarily 0 and may be any speed lower than Vbelt3.

In the state shown in FIG. 4G, the paddle 6*b* driven by the second driving system reaches a position at t2 in FIG. 5. More specifically, a loaf of bread B next to the loaf of bread B bagged by the paddle 5*b* is conveyed to the upstream side of the jaws 83 of the bread packaging apparatus 103 by the in-feed conveyer 107. In the bread packaging apparatus 103, air is supplied to start opening the mouth of a bag C.

In the state shown in FIG. 4H, the paddle 6*b* conveys the loaf of bread B placed in the vicinity thereof at speed V2 (time t3 in FIG. 5) and enters the opened jaws 83, as described in relation to FIG. 4C. Then the loaf of bread B conveyed by the paddle 6*b* reaches the mouth of the bag C (FIG. 4I), is further conveyed to the downstream side in the conveying direction D, and introduced into the bag C (FIG. 4J).

In this embodiment, the speed of the paddles 5 and 6 is reduced from V1 to 0 at a point near time t3 at which one of the paddles 5 and 6 comes into contact with a loaf of bread B. Then the speed of the one of the paddles 5 and 6 that is in contact with the loaf of bread B is increased from 0 to predetermined speed V2. The speed V1 of the paddles 5 and 6 is a value suitable for the purpose of contact with the loaf of bread B. Therefore, even when the paddles 5 and 6 are not stopped temporarily and are accelerated to speed V2, the loaf of bread B is prevented from being damaged and from being sent flying from the conveying path T. However, when the paddles 5 and 6 are stopped temporarily and then the speed is increased from 0 to V2, the impact applied to the loaf of brad B can be reduced. Therefore, when importance is attached to the contact speed V1 in consideration of the softness etc. of the bread, it is preferable to control the speed in the manner described in the above embodiment.

Other components of the bread convening system 101 will next be described in brief. The controller 111 is electrically connected to components such as the bread packaging apparatus 103, the in-feed conveyer 107, and the out-feed conveyer 109. The controller 111 includes a known CPU (Central Processing Unit), a ROM (Read Only Memory) that stores predetermined programs, an RAM (Random Access Memory), an EEPROM (Electrically Erasable and Programmable Read Only Memory) that stores various setting values, etc., and the CPU executes a control program stored in the ROM etc. to perform various processes described above such as conveyance and packaging of loaves of bread.

As shown in FIGS. 1A and 1B, the in-feed conveyer 107 includes: a main conveyer 88 on which a loaf of bread B lying sideways is placed with its protruding convex upper surface facing the upstream side; and two sub-conveyers 89 and 91 opposed to each other in a direction orthogonal to the conveying direction D with the main conveyer 88 therebetween. In this in-feed conveyer 107, a loaf of bread B is conveyed with its three faces supported by the main conveyer 88 and the sub-conveyers 89 and 91. In this embodiment, the controller 111 controls the conveyance speed Vbelt2 of the in-feed conveyer 107 such that the speed Vbelt2 is the same as the conveyance speed Vbelt1 of the out-feed conveyer 113 in the upstream step. Therefore, the loaf of bread B is conveyed by the in-feed conveyer 107 at the same conveyance speed as that of the out-feed conveyer 113 in the upstream step.

A bagged loaf of bread B is conveyed to the out-feed conveyer 109 by the bread packaging apparatus 103 with the convex upper surface of the loaf of bread B facing the upstream side in the conveying direction D, as in the out-feed conveyer 113. In contrast to the in-feed conveyer 107, the out-feed conveyer 109 includes only a main conveyer that supports one side surface of a loaf of bagged bread B and does not include sub-conveyers. The conveyance speed Vbelt3 of the out-feed conveyer 109 is controlled by the controller 111 such that the speed is higher than the speed V2 of the paddles 5 and 6 when the contact between the loaf of bread B and one of the paddles 5 and 6 is released.

In this embodiment, at a time point t4 at which a loaf of bread B is transferred to the out-feed conveyer 109 by one of the paddles 5 and 6 (see FIGS. 5 and 4G), the conveyance speed is 0 or a value close to 0. Therefore, the speed of the out-feed conveyer 109 can be relatively slow, so that the degree of design freedom of the supply speed of loaves of bread B in the downstream step can be increased. As described above, the object of the invention is achieved not by setting the speed V2 of the paddles 5 and 6 to be always lower than the speed Vbelt3 of the out-feed conveyer 109 but by setting the speed V2 such that it is lower than the speed Vbelt3 of the out-feed conveyer 109 when the contact between a loaf of bread B and one of the paddles 5 and 6 is released.

In this embodiment, the worm gears are connected to the drive motors, and the driving shafts and the sub-driving shafts extend only downward in the plan view in FIG. 1A. However, the driving shafts (or the driving shafts and the sub driving shafts) may extend also upward. In this case, a bread packaging apparatus and a bread conveying system including a plurality of conveying paths can be configured. The pusher assembly in this embodiment includes the second and third driven pulleys, and each endless belt-shaped body has a rounded rectangular trajectory as viewed from the front. However, only one of the second and third driven pulleys may be provided. In this case, each endless belt-shaped body has a rounded triangular trajectory. Alternatively, the number of driven pulleys may be further increased. In this case, each endless belt-shaped body has a rounded polygonal trajectory.

In this embodiment, the resin-made endless belts 7a and 7b are used as the endless belt-shaped bodies wound over the sprockets of the driving force transmission mechanism of the pusher assembly 1. However, metal-made endless belts or resin-made or metal-made chains may also be used.

In the description of this embodiment, cubic loaves of bread having a convex face are used. However, the present invention is not limited to such cubic loaves of bread and can be applied to a bread packaging apparatus and a bread conveying system for processing bread having various dimensions and shapes. In this embodiment, the objects conveyed are loaves of breads. However, the present invention can be applied to packaging apparatuses and conveying systems for conveying not only food but also various articles.

This application claims the benefit of Japanese Patent Application No. 2013-040610, filed Mar. 1, 2013, which is hereby incorporated by reference herein in its entirety.

What is claimed is:

1. A bread conveying apparatus for conveying bread, the apparatus comprising:
    a plurality of urging units that urge loaves of bread and convey the loaves of bread on a same conveying path in a conveying direction; and
    a control unit for controlling a speed of the plurality of urging units,
    wherein each of the plurality of urging units includes a driving rotation body that rotates by rotation force from a driving source, a driven rotation body that cooperates with the first driving rotation body and an endless belt-shaped body wound over the driving rotation body and the driven rotation body to rotate,
    wherein the driving rotation body is disposed on a downstream side than the driven rotation body with respect to the conveying direction, and
    wherein an outer circumference of the driving rotation body is engaged with an inner circumference of the endless belt-shaped body.

2. The bread conveying apparatus according to claim 1, wherein each of the plurality of urging units includes a paddle for coming into contact with the loaf of bread and the control unit controls the speed of the paddle such that the speed when the paddle comes into contact with the loaf of bread is lower than the speed when the paddle conveys the loaf of bread.

3. The bread conveying apparatus according to claim 1, wherein each of the urging units includes a paddle for coming into contact with the loaf of bread and the control unit controls the speed of the paddle such that the speed of the paddle when contact of the paddle with the loaf of bread is released is lower than a conveyance speed of a conveying unit disposed on the downstream side in the conveying direction.

4. The bread conveying apparatus according to claim 1, wherein each of the urging units includes a paddle for coming into contact with the loaf of bread and the control unit controls the paddle such that the paddle is stopped when the paddle comes into contact with the loaf of bread.

5. The bread conveying apparatus according to claim 1, wherein the endless belt-shaped body is displaced from the conveying path in a plan view.

6. The bread conveying apparatus according to claim 1, wherein the plurality of urging units include a paddle for coming into contact with the loaves of bread and the paddle projects from the endless belt-shaped body in a width direction thereof.

7. The bread conveying apparatus according to claim 1, wherein at least one of the plurality of urging units includes a paddle for coming into contact with the loaf of bread, and the paddle is rotatably supported by at least one of the endless belt-shaped bodies that the at least one of the plurality of urging units includes to maintain a posture of the paddle regardless of rotation of the at least one of the endless belt-shaped bodies.

8. The bread conveying apparatus according to claim 7, wherein an end of the paddle is supported by the at least one of the endless belt-shaped bodies through a rod member extending in a direction crossing the conveying direction and through a link rod extending in the conveying direction.

9. A bread conveying system for conveying a plurality of loaves of bread on a conveying path in a conveying direction, the system comprising:
    a first urging unit that urges a loaf of bread and conveys the loaf of bread along the conveying path;
    a second urging unit that urges another loaf of bread and conveys the another loaf of bread along the conveying path; and
    a control unit for controlling a speed of the first urging unit and a speed of the second urging unit,
    wherein the first urging unit includes a first driving rotation body that rotates by rotation force from a driving source, a first driven rotation body that cooperates with the first driving rotation body and an endless belt-shaped body wound over the first driving rotation body and the first driven rotation body to rotate,
    wherein the second urging unit includes a second driving rotation body that rotates by rotation force from the driving source, a driven rotation body that cooperates with the first driving rotation body and a second endless belt-shaped body wound over the second driving rotation body and the second driven rotation body,
    wherein the first driving rotation body is disposed on a downstream side than the first driven rotation body with respect to the conveying direction,
    wherein the second driving rotation body is disposed on a downstream side than the second driven rotation body with respect to the conveying direction,
    wherein a first outer circumference of the first driving rotation body is engaged with a first inner circumference of the first endless belt-shaped body, and
    wherein a second outer circumference of the second driving rotation body is engaged with a second inner circumference of the second endless belt-shaped body.

10. The bread conveying system according to claim 9, wherein the first urging unit and the second urging unit are driven by respective different driving sources.

11. The bread conveying system according to claim 9, wherein at least one of the first and second urging units includes a paddle for coming into contact with the loaf of bread, and the paddle is rotatably supported by at least one of the first and second endless belt-shaped bodies that the at least one of the first and second urging units includes to maintain a posture of the paddle regardless of rotation of the at least one of the first and second endless belt-shaped bodies.

12. The bread conveying system according to claim 11, wherein an end of the paddle is supported by the at least one of the first and second endless belt-shaped bodies through a rod member extending in a direction crossing the conveying direction and through a link rod extending in the conveying direction.

13. The bread conveying system according to any claim 9, wherein the control unit controls the first urging unit and the second urging unit such that the first urging unit and the second urging unit pass through the conveying path alternately.

14. The bread conveying system according to claim 9, the system further comprising a conveying unit for conveying the loaf of bread and the another loaf of bread, the conveying unit being disposed on a downstream side of the first urging unit and the second urging unit in the conveying path,
wherein the control unit controls conveyance speed of the loaf of bread and the another loaf of bread conveyed by the conveying unit such that the conveyance speed is higher than the speed of the first urging unit when contact of the first urging unit with the loaf of bread is released and higher than the speed of the second urging unit when contact of the second urging unit with the another loaf of bread is released.

15. The bread conveying system according to claim 9, wherein the first and second endless belt-shaped bodies are displaced from the conveying path in a plan view.

16. The bread conveying system according to claim 9, wherein each of the first and the second urging units includes a paddle for coming into contact with the loaf of bread and the paddle projects from the endless belt-shaped body in a width direction thereof.

17. The bread conveying system according to claim 9, wherein the first driving rotation body or the second driving rotation body includes a plurality of driving rotation bodies and a plurality of rotation axes of the plurality of driving rotation bodies are disposed at positions different from each other with respect to the conveying direction.

18. The bread conveying system according to claim 9, wherein each of the first and the second urging units includes a paddle for coming into contact with the loaf of bread, the first endless belt-shaped body or the second endless belt-shaped body includes a plurality of endless belt-shaped bodies and the paddle is mounted on the plurality of endless belt-shaped bodies at positions thereof different from each other with respect to the conveying direction.

19. A bread packaging apparatus for packaging bread in a bag, the bread packaging apparatus comprising:
a plurality of urging units that urges a loaf of bread and conveys the loaf of bread on a same conveying path in a conveying direction;
a control unit for controlling a speed of the plurality of urging units; and
a bread bag supply apparatus including a bag holding portion that contains a folded bag and an opening mechanism that opens the folded bag,
wherein each of the plurality of urging units includes a driving rotation body that rotates by rotation force from a driving source, a driven rotation body that cooperates with the first driving rotation body and an endless belt-shaped body wound over the driving rotation body and the driven rotation body to rotate,
wherein the driving rotation body is disposed on a downstream side than the driven rotation body with respect to the conveying direction, and
wherein an outer circumference of the driving rotation body is engaged with an inner circumference of the endless belt-shaped body.

20. The bread packaging apparatus according to claim 19, wherein the plurality of urging units includes a paddle for coming into contact with the loaf of bread and the control unit controls the speed of the paddle such that the speed when the paddle comes into contact with the loaf of bread is lower than the speed when the paddle conveys the loaf of bread.

21. The bread packaging apparatus according to claim 19, wherein each of the urging units includes a paddle for coming into contact with the loaf of bread and the control unit controls the speed of the paddle such that the speed of the paddle when contact of the paddle with the loaf of bread is released is lower than a conveying speed of a conveying unit disposed on the downstream side in the conveying direction.

22. The bread packaging apparatus according to claim 19, wherein each of the urging units includes a paddle for coming into contact with the loaf of bread and the control unit controls the paddle such that the paddle is stopped when the paddle comes into contact with the loaf of bread.

23. The bread packaging apparatus according to claim 19, wherein at least one of the plurality of urging units includes a paddle for coming into contact with the loaf of bread, and the paddle is rotatably supported by at least one of the endless belt-shaped bodies that the at least one of the plurality of urging units includes to maintain a posture of the paddle regardless of rotation of the at least one of the endless belt-shaped bodies.

24. The bread packaging apparatus according to claim 23, wherein one end of the paddle is supported by the at least one of the endless belt-shaped bodies through a rod member extending in a direction crossing the conveying direction and through a link rod extending in the conveying direction.

* * * * *